United States Patent [19]

Basarath et al.

[11] Patent Number: 4,845,637

[45] Date of Patent: Jul. 4, 1989

[54] FEEDER MONITOR ARRANGEMENT FOR STORED PROGRAM CONTROLLED RECTIFIER PLANT

[75] Inventors: Brian A. Basarath, Denville; Harry K. Ebert, Jr., Whippany; Henry E. Menkes, Pine Brook, all of N.J.

[73] Assignee: American Telephone and Telegraph Company, AT&T Bell Laboratories, Murray Hill, N.J.

[21] Appl. No.: 143,287

[22] Filed: Jan. 7, 1988

Related U.S. Application Data

[63] Continuation of Ser. No. 700,196, Feb. 11, 1985, abandoned.

[51] Int. Cl.[4] .................. G05B 19/02; G06F 15/46
[52] U.S. Cl. ...................................... 364/492; 364/483; 363/70
[58] Field of Search ............... 364/134, 133, 493, 481, 364/483, 492, 530, 556; 363/84, 79, 70, 69, 51; 307/11, 12

[56] References Cited

U.S. PATENT DOCUMENTS

| | | | |
|---|---|---|---|
| 3,972,470 | 8/1976 | Takagi | 364/492 |
| 4,054,786 | 10/1977 | Vincent | 364/575 |
| 4,055,801 | 10/1977 | Pike et al. | 364/550 |
| 4,106,085 | 8/1978 | Demarest et al. | 363/51 |
| 4,212,057 | 7/1980 | Devlin et al. | 364/200 |
| 4,445,090 | 4/1984 | Melocik et al. | 364/483 |
| 4,451,773 | 5/1984 | Papathomas et al. | 320/59 |
| 4,467,314 | 8/1984 | Weikel et al. | 364/492 |
| 4,475,150 | 10/1984 | D'Atre et al. | 364/483 |
| 4,633,412 | 12/1986 | Ebert, Jr. et al. | 364/493 |

Primary Examiner—Parshotam S. Lall
Assistant Examiner—S. A. Melnick
Attorney, Agent, or Firm—Alfred G. Steinmetz

[57] ABSTRACT

A rectifier plant controller is combined with a continuously operating feeder monitor option in order to provide feeder line data on demand. The feeder monitor option continuously monitor feeder lines selected by the rectifier plant controller and stores the data acquired in a memory accessible to both the feeder monitor option and the rectifier plant controller. The rectifier plant controller can recover the data upon request at any time.

6 Claims, 10 Drawing Sheets

FIG. 10

1259 ENTER CAPACITY VALUE. CALCULATE PROCESSING CONSTANTS. INITIALIZE REGISTERS IN DUAL ACCESS MEMORY → RETURN

1301 CASE FEEDER STATISTICS

1303 HAS CLEAR BOTTON BEEN PUSHED ? — YES →

NO ↓

1305 NUMBER OR ENTER BUTTON PUSHED ? — YES → 1306 RETURN

NO ↓

1307 SET NEXT LINE, SET PREVIOUS LINE

1309 ANY CHANNEL TO RETRIEVE DATA ? — NO →

YES ↓

1311 USE LINE NUMBER TO SELECT A CHANNEL THAT IS PRESENT

FEEDER MONITOR ARRANGEMENT FOR STORED PROGRAM CONTROLLED RECTIFIER PLANT

This application is a continuation of application Ser. No. 700,196, filed Feb. 11, 1985 now abandoned.

BACKGROUND OF THE INVENTION

This invention relates to a rectifier plant system and more particularly to a signal monitoring arrangement for such a rectifier plant system.

The feeder currents of a rectifier plant system have previously been manually ascertained by a craftsman using portable meters. With the advent of stored program control for rectifier plant systems, it is now feasible to automate the measurement of feeder currents. Because the measuring apparatus adds to the cost of the control system, it is desirable to make the automated feeder current measurement feature an option that can be included with or added to a control system in accord with a customer's desire for features.

SUMMARY OF THE INVENTION

A rectifier plant controller, embodying the principles of the invention, includes a feeder monitor data acquisition option which operates continuously under an independent stored program control to gather data from selected feeder channels or lines which are predesignated under control of the rectifier plant controller. The rectifier plant controller directs the feeder monitor data acquisition system to monitor specified feeder lines and the feeder monitor option responds by continuously collecting data on each individual feeder line, it is directed to monitor. This data is stored in a dual access memory included in the data acquisition system which is directly accessible by the rectifier plant controller. The rectifier plant controller responds to local command input to directly access data in the dual access memory relating to feeder lines specified by the command and processes the accessed data to calculate values representative of statistical information and of actual signal values on the feeder line.

BRIEF DESCRIPTION OF THE DRAWINGS

FIGS. 3–11 are block diagram flow charts of the stored program control for the feeder monitor.

DETAILED DESCRIPTION

Figure 1:
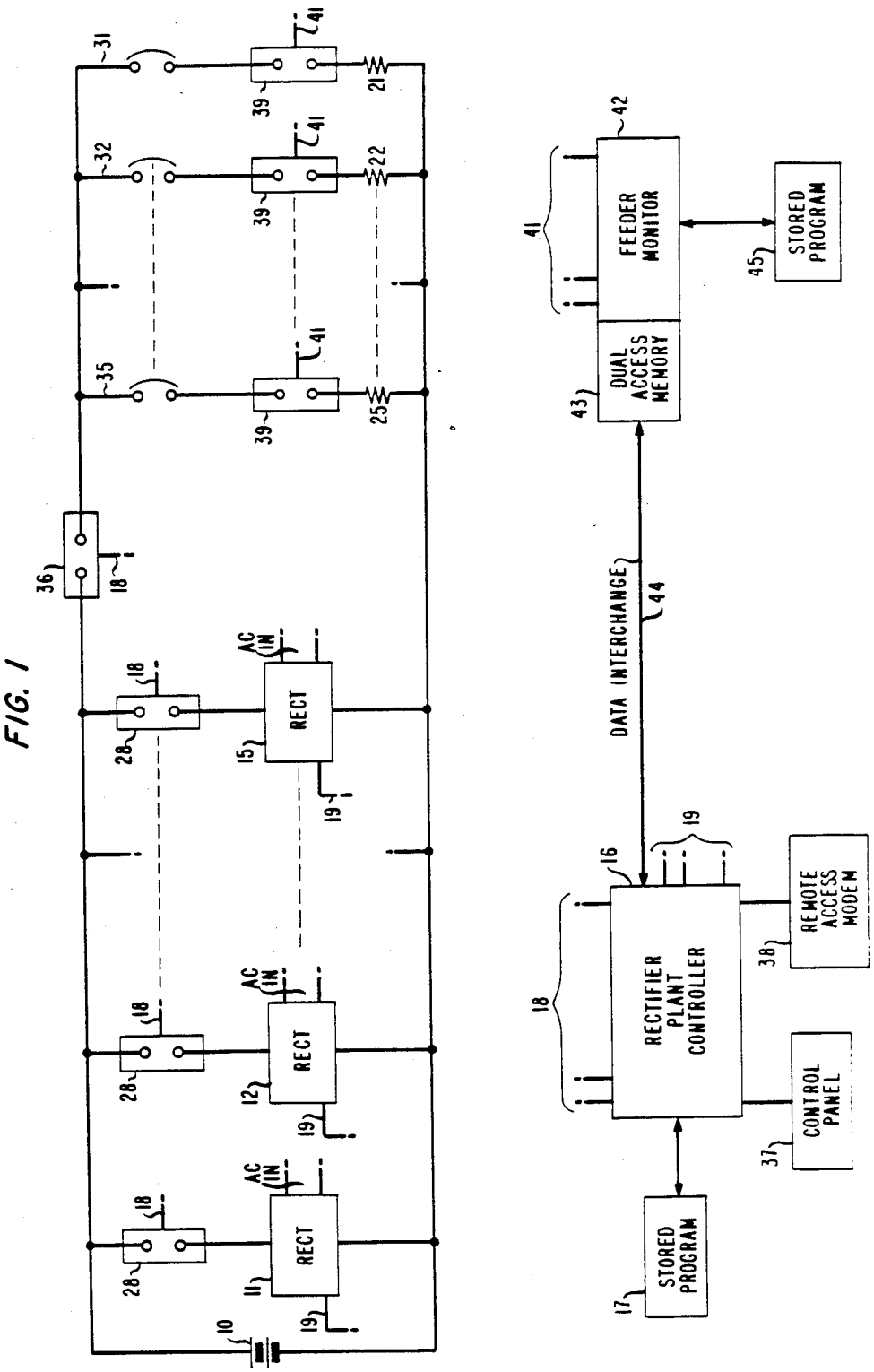
FIG. 1 is a block diagram of a rectifier plant system operating under stored program control and including feeder monitoring capability.

The rectifier plant system shown in FIG. 1 includes a plurality of rectifiers connected in parallel as shown illustratively by rectifiers 11, 12 and 15. Each rectifier shunts a storage battery 10 and is connected to a plurality of loads connected in parallel as shown illustratively by resistor loads 21, 22 and 25 through various feeder lines 31, 32 and 35. The operating state of the individual rectifiers 11, 12 and 15 is controlled by a rectifier plant control 16 which operates under the control of a stored program 17. The rectifier plant control 16 monitors individual rectifier current outputs, via sense leads 18, at the current shunts 28 and the combined current output at the output current shunt 36. The rectifier controller 16 may be controlled by an operator at a control panel 37 or by remote telephone access through an optional modem 38. Operation control commands are supplied to individual rectifiers 11, 12 and 15, via lead 19 to turn on or turn off rectifiers or perform other functions.

Each individual feeder line 31, 32 and 35 connected to loads 21, 22 and 25, respectively also includes a current shunt 39 which is coupled via leads 41 to be monitored by a feeder monitor circuit 42 which operates under stored program control 45. It is connected, via lead 41, to monitor currents in each feeder line 31, 32 and 35, although it may be controlled to not monitor all these lines especially if they are inactive. A dual access memory 43 used to store feeder signal information is connected to the feeder monitor 42, and via a data bus 44, to the rectifier plant control 16.

The feeder monitor circuit 42 contains its own stored program control 45 (FIG. 1) and is also responsive to commands from the rectifier plant control 16 supplied, via data bus 44. The feeder monitor circuit 42 is initially instructed by commands from the rectifier plant control 16 placed in the dual access memory as to the particular data to be collected and which particular feeders to monitor. These commands are implemented by the feeder monitor circuit 42 by storing the relevant requested information in the dual access memory 43. Feeder monitor circuit 42 collects the desired data continuously from the feeder monitor lines 31, 32 and 35 and stores it into the dual access memory 43 and continuously updates it. At any time a command from the rectifier plant control 16 can access data from the dual access memory 43 via bus 44 in order to determine the current status of any particular feeder 31, 32 and 35. The raw data, from the dual access memory 43, is converted to useful information by stored program instructions included in the stored program control 17 of the rectifier control 16.

Figure 2:
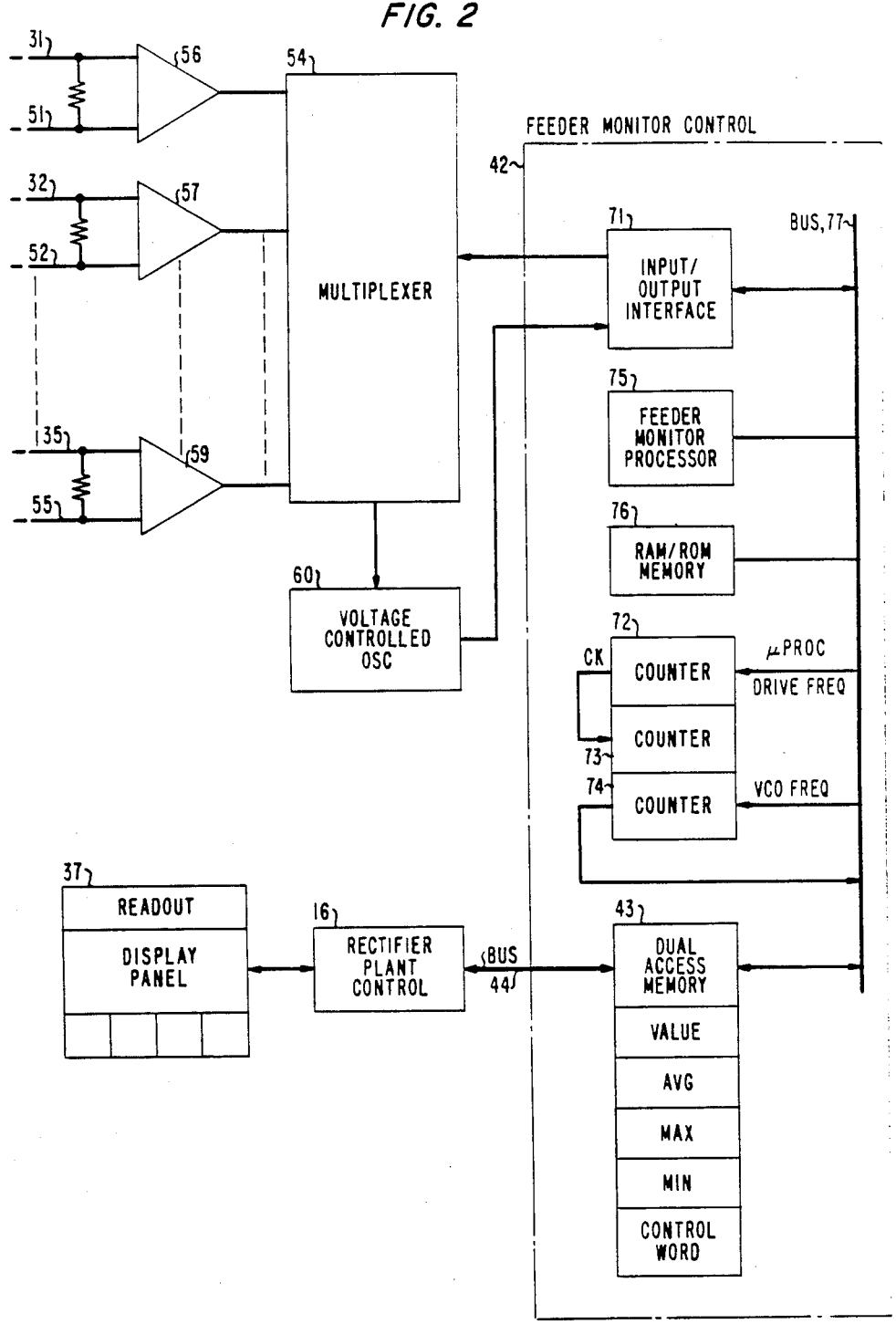
FIG. 2 is a block schematic of the feeder monitoring circuitry and its related stored program control.

The feeder monitor circuit is shown in more detail in FIG. 2. Each feeder line 31, 32 and 35 includes a current shunt 51, 52 and 55, each of which is connected to be sensed by an amplifier 56, 57 and 59. The amplifier outputs are connected to a multiplexer 54 which operates under control of the feeder monitor circuit 42. The output of an amplifier 56, 57 or 59 selected by the multiplexer 54 is applied to a voltage-to-frequency converter 60 whose output is in turn coupled to the feeder monitor circuit 42.

The feeder monitor circuit 42 includes an input/output optical isolation interface 71, a series of three interconnected counters 72, 73 and 74, a processor 75, a local memory 76, and the dual access memory 43, all of which are connected to a common internal bus 77. The dual access memory 43 is also connected via the external bus 44 to permit it to be accessed by the rectifier plant control 16. The dual access memory 43 is a memory circuit that allows direct access into its memory locations by two independent processing systems. Such memory circuits are well known in the art, and it is not believed necessary to discuss them herein in detail.

The feeder monitor processor 75 operates in response to a stored program in the memory 76 and is further responsive to stored command words (control words) in the dual access memory 43, all of which are operative to command the multiplexer 54 to connect the voltage controlled oscillator 60 to selected amplifiers 56, 57 and 59 in order to monitor current in selected feeder lines. As each amplifier 56, 57 and 59 is connected to the oscillator 60, via the multiplexer 54, a signal frequency is generated which is representative of the current magnitude sensed on those particular current shunts 51, 52 and 55.

The signal frequency supplied by oscillator 60 is applied to the input/output interface 71 of the feeder monitor circuit 42 and from there, via bus 77, to a three counter array. It is directly applied to counter 74 which is a part of the three counter array comprising counter 72, counter 73 and counter 74. Counter 72 counts down the driving frequency of the feeder monitor processor 75 to produce a relative low frequency signal (200 Hz). Its low frequency output is utilized to clock the count of counter 73 which, in turn, operates in a one shot mode by counting down an internal count to define a time interval which is used to start and stop counter 74. Counter 74 receives and counts the cycles of the signal output of oscillator 60 for the fixed time interval defined by counter 73. The resulting count is a raw data measure of the current in the particular feeder being monitored. This particular count is coupled by the bus 77 to the dual access memory 43 where it is stored in an address assigned to that particular feeder replacing a previous count thereat.

The feeder monitor stored program in memory 76 also manipulates this raw data count through the processor 75 to achieve maximum and minimum values and an average value in addition to the present current value count. These count values are all stored in the dual access memory 43 where they are accessible to both the feeder monitor processor 75 and the rectifier plant control 16.

Figure 12:
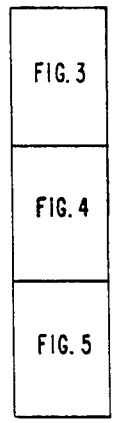
FIGS. 12 and 13 show how to combine FIGS. 3–11 to complete various flow charts of instruction routines.
Figure 13:
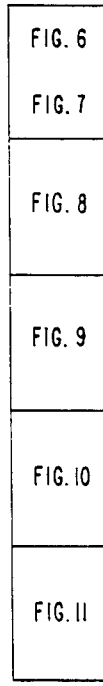
Figure 6:
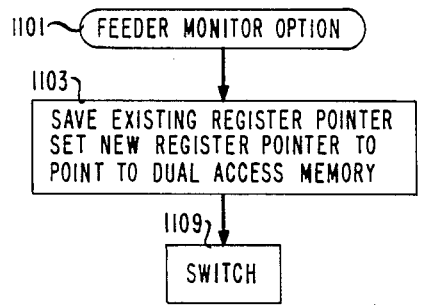

An understanding of the operation of the circuitry may be gained by reference to the stored program instruction routines controlling its operation as exemplified by the flow charts of FIGS. 3-11 which are connected as shown in FIGS. 12 and 13. The stored program flow chart of FIGS. 3-5 connected as shown in FIG. 12 details the stored program instructions of the feeder monitor control 42 relating to monitoring feeder currents. These instructions direct the multiplexer 54 to connect the sensed feeder shunt signals of amplifiers 56-59 to the voltage controller oscillator 60. Specific operations performed include the counting of the oscillator signal frequency, computations of average signal values, and determination of maximum/minimum signal values. These signal values are continuously updated and stored in the dual access memory 43 where they are available to be accessed by the rectifier plant control 16.

Figure 3:
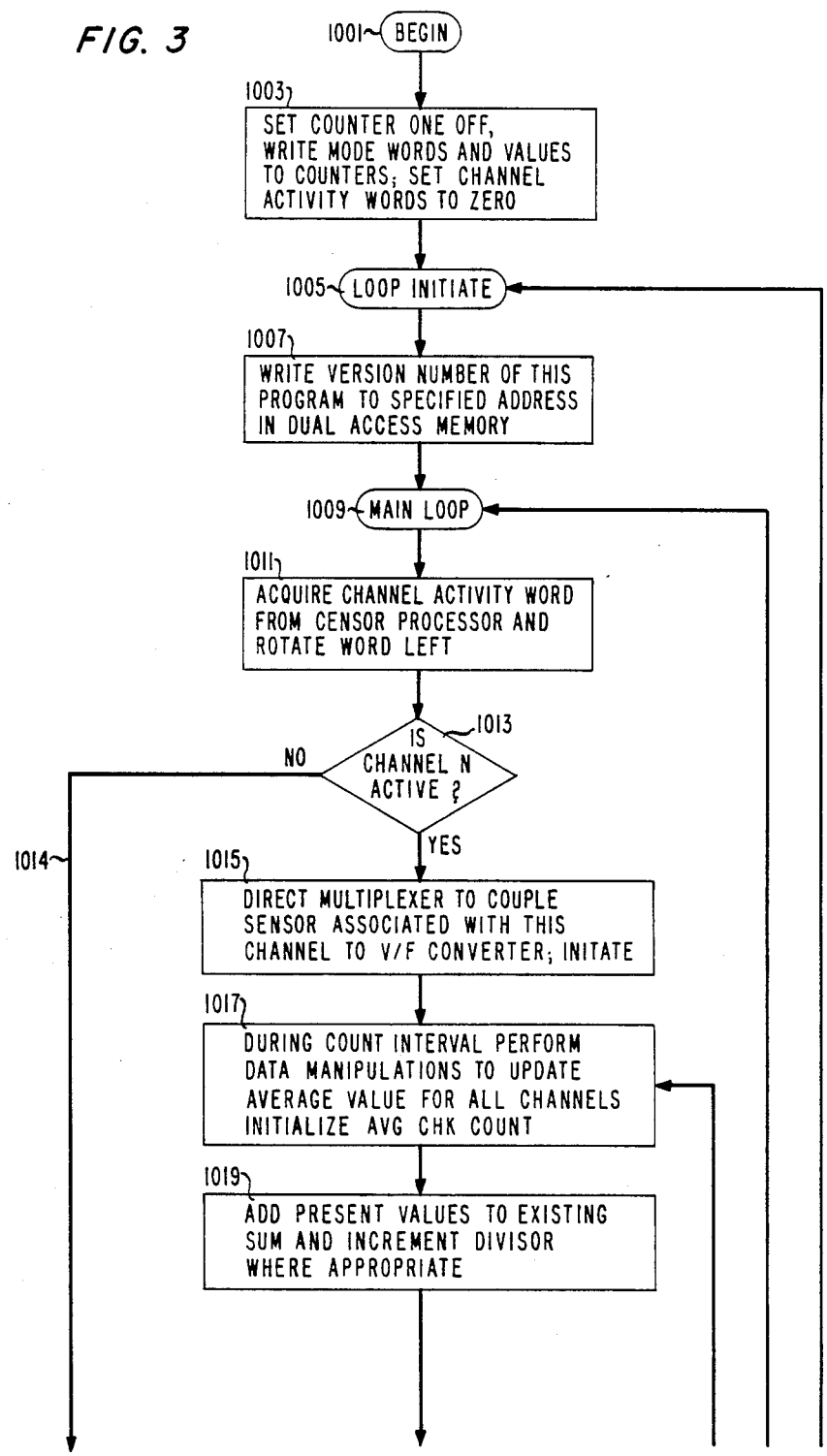
Figure 4:
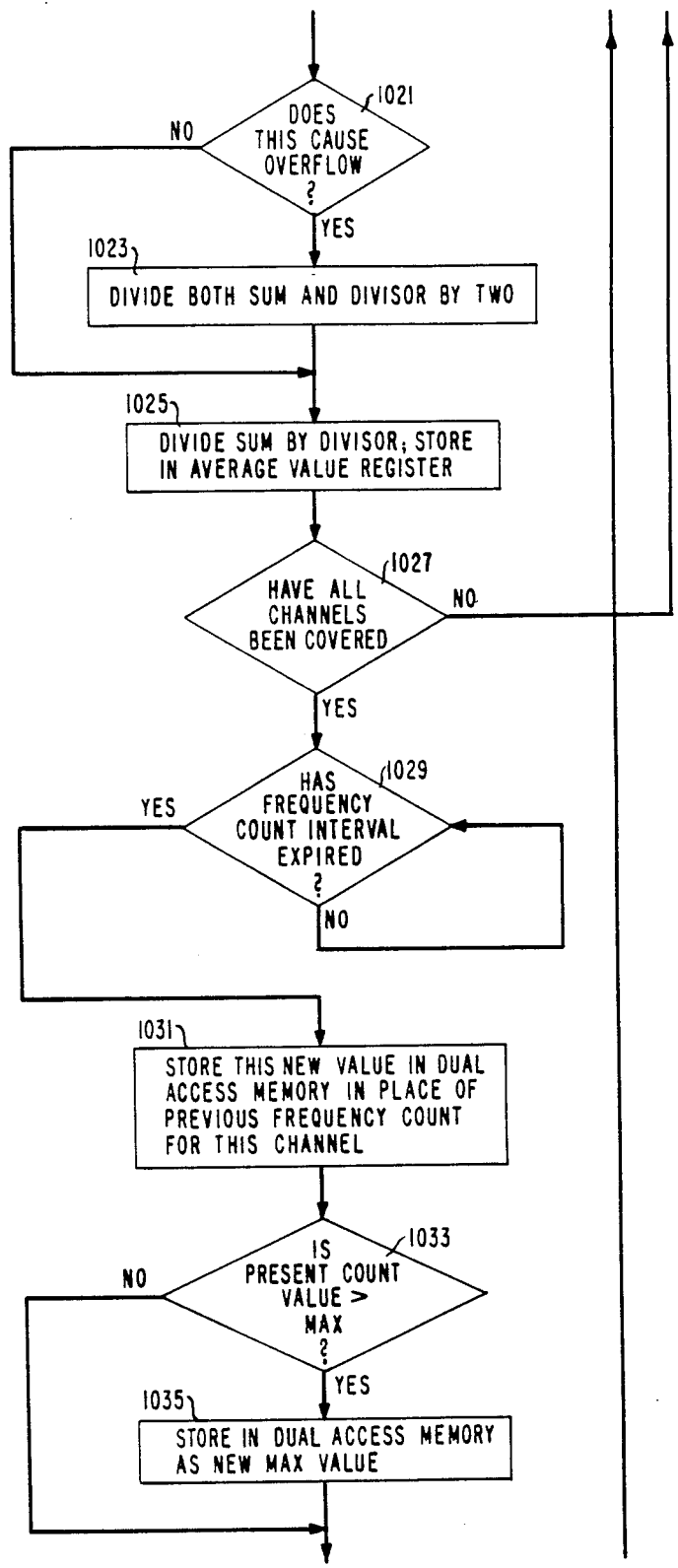
Figure 5:
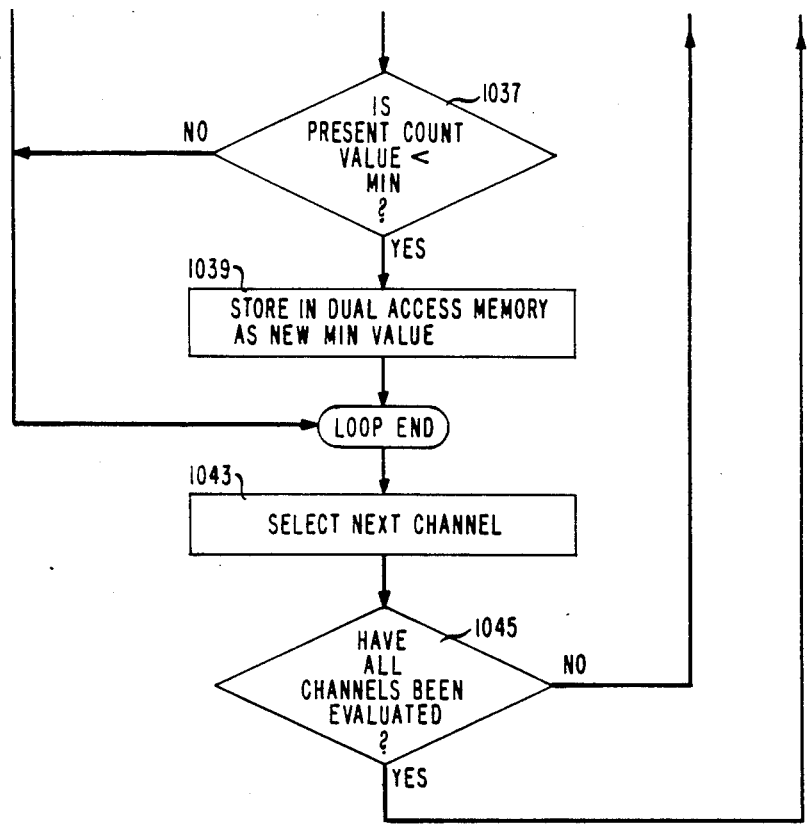

The stored program of the feeder monitor circuit as shown in FIG. 3 starts at begin terminal 1001 and proceeds to the first block of instructions 1003 which are operative to preset the counter status of counters 72, 73 and 74 and also preset a channel activity word in the dual access memory 43 to zero. The channel activity word is a word stored in the dual access memory whose individual bits identify the active feeder channels that are to be monitored. The channel activity word is supplied to the dual access memory subsequent to this zeroing operation by the rectifier plant control 16. The loop of instructions following this preparation is initiated at loop initiate terminal 1005 and a version number of the program is verified at the subsequent instruction 1007 to determine if this program is compatible with the current version of the stored program of the rectifier plant control 16. The main loop is entered at terminal 1009 and the channel activity word which identifies feeder lines to be monitored is acquired from stored program control of the rectifier plant control 16 and stored in the dual access memory 43 as per instruction 1011. It is evaluated by rotating the word as per instruction 1011 to identify bits that designate the particular channels to be monitored. The channel activity word, as indicated above, designates the specific feeder channels to be monitored by the feeder monitoring circuit and may be changed by the stored program of the rectifier plant control.

The program starts with an activity word and numbers designating the channels and initially begins to compare feeder numbers to the activity word and inquires at decision 1013 if a particular channel identified by the activity word bit is currently active (i.e., in use). If it is not active, the instruction routine proceeds via line 1014 to instruction 1043 where the channel number is decremented to select a next channel. If it is active, instruction 1015 directs the multiplexer to connect the amplifier monitoring the desired current shunt to the voltage controlled oscillator 60. The frequency count interval is initiated and the output of the voltage controlled oscillator is counted by counter 74. During the counting interval, the previously stored data in the dual access memory is accessed by the feeder monitor circuit as per instruction 1017 to recalculate or redetermine the maximum/minimum and average values from previously sensed values. Average value is determined by adding a current value to a previous sum and incrementing the division and performing the division as indicated in instruction 1019. If an overflow condition of the sum number is determined by decision 1021, the present sum and divisor are divided by two as per instruction 1023 and instruction 1025 then computes the average. The averaging process is continued for all channels until the final channel is completed as per instruction 1027.

At the expiration of the frequency counting interval by counter 74, as determined by decision 1029, the new count value is inserted into the dual access memory 43 at the address associated with that particular feeder line as per instruction 1031. These new values are compared with the present maximum and minimum values as per instructions 1033 and 1037 and, if one of them is a new maximum or minimum value, the previous value is replaced with the new value as per instruction 1035 or 1039. The next channel is then designated to have its current evaluated (1043) and when all channels have been evaluated (1045) the loop is reinitiated at 1005.

The stored program of the rectifier plant controller includes instructions to enable it to interact with the feeder monitor when requested to do so by an operator entered command: this instruction routine shown in FIGS. 6-11 and connected as shown by FIG. 13 is initiated by a local command comprising push button sequences to the rectifier plant controller requesting feeder status information at terminal 1101. A request for feeder information may also be entered remotely via a telecommunications channel. Such a request is similar to the below described routine, except no button sequence protocol need be discerned since commands are entered directly. Commands are entered locally by activating buttons on a control panel. Since available buttons are limited, a sequence of button entries defines different requests as are shown by the following instruction routine. The dual access memory addresses relating to specified feeder lines are set in the appropriate register 1103. The subsequent instruction routine evaluates a sequence of buttons pushed to determined the nature of a request. Buttons available include a current request, a statistics request, number buttons, an enter button and a clear button. Information and entry requests may also be entered remotely, however, this mode is not discussed herein. A switch command request determines the proper path of the below instruction routine to be selected 1109. The switch command is an if else type statement command that compares an expression against different values, that is, if the feeder option requests a present current value or statistical values.

Figure 7:
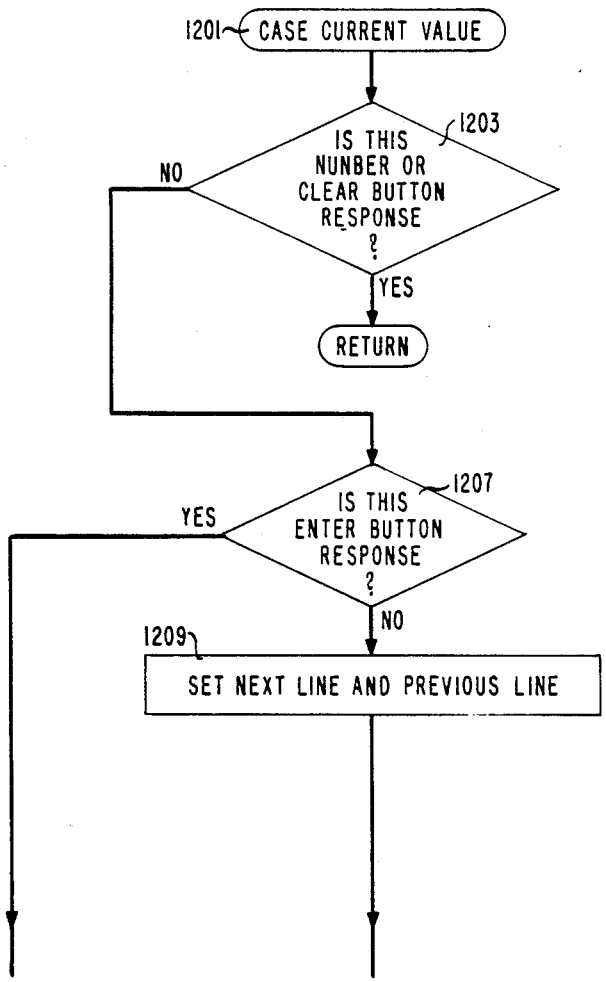
Figure 8:
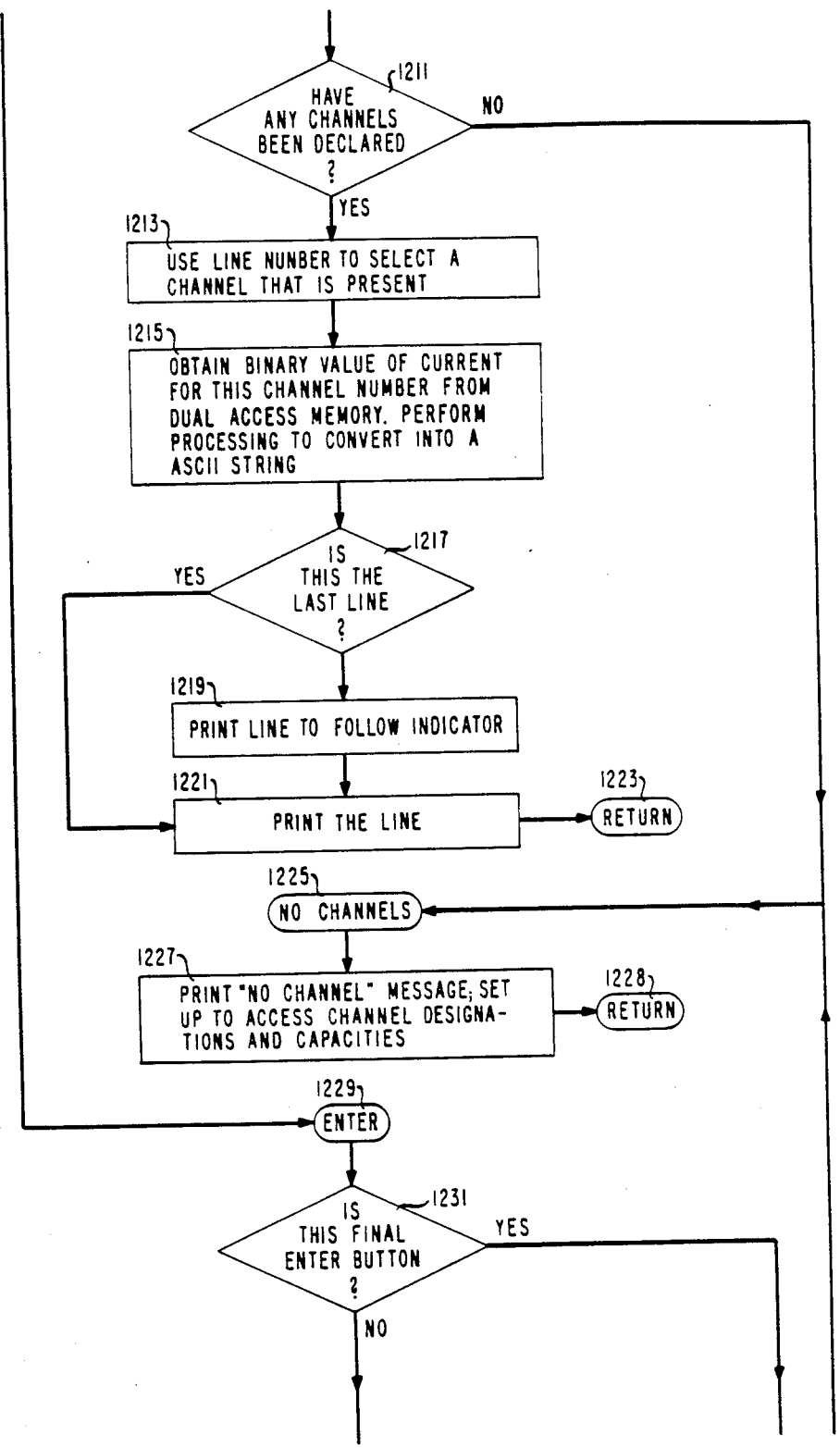
Figure 9:
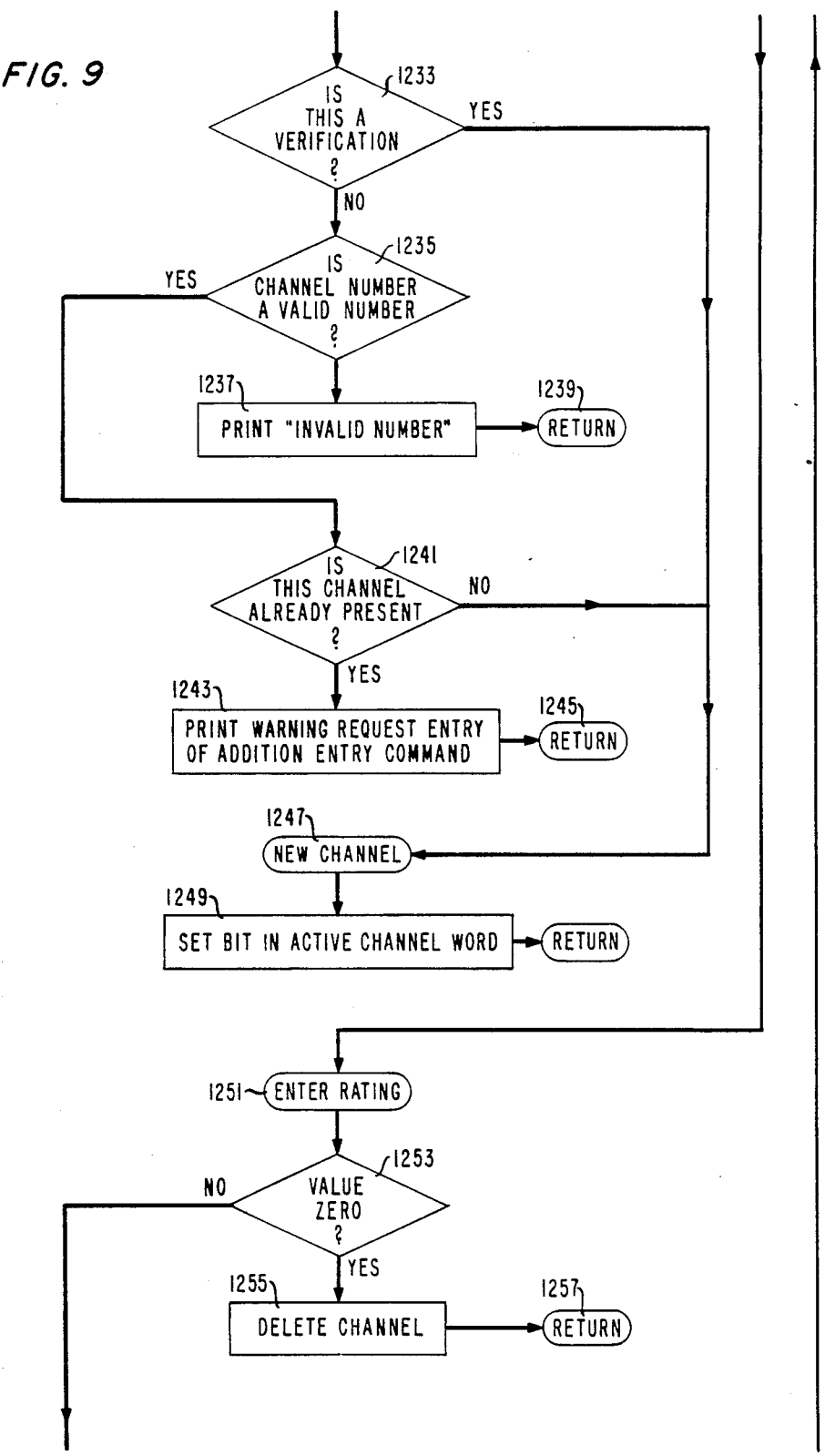
Figure 11:
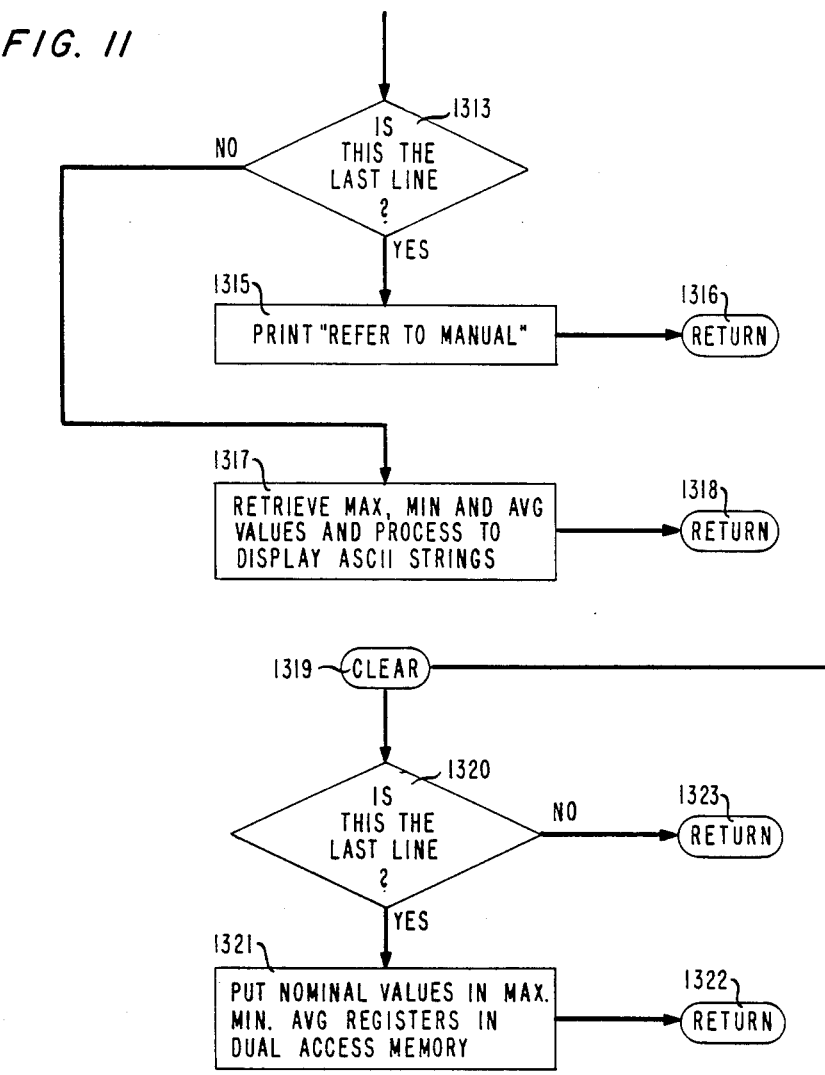

A request to read out or recover the present current value or change the capacity of a feeder line invokes the instruction routine beginning at terminal 1201 in FIG. 7 which comprises instructions to determine if a present current value is to be ascertained or if new feeder capacity is to be set or if a feeder channel is to be added to or deleted from the list of feeder lines monitored. The command options include a display command, an enter command to identify and set values for a new channel, a clear command to remove a feeder from monitored status and a number command to permit the insertion of a capacity to a newly added feeder. The number, enter and clear command must be entered in a proper sequence to effect different results as determined by the instruction routine.

The instruction sequence clearly identifies the nature of the request by identifying a particular sequence of panel button entries via decision instructions 1203, 1207 and 1231, all of which evaluate the button sequence in order to determine the exact subsequent sequence of instructions to be followed. Instruction 1209 sets the next and previous line to determine if current entry is a sensible value.

If a feeder value is to be determined instruction 1211 determines if any feeder lines have been declared. If the line requested has been declared, the instructions supply a prompt to the requester, enter a line number as per instruction 1213 and the program responds thereto by recovering the raw binary data for the feeder and subsequent feeder lines accessed in sequence from the dual access memory as per instruction 1215. This raw data is processed by instructions in the stored program of the rectifier plant control and converted into signal data to specify the current level and capacity in the selected feeder line as per instruction 1215. This current value request is automatically stepped through to access all the feeder lines being monitored until the last line is reached (as per instructions 1219, 1221 and 1223), whereupon the program loop returns to terminal 1101. Instruction 1219 reflects the requirement that each line request must be manually entered.

If no channels are disclosed as being set up for monitoring (instruction 1211 and 1215) a "no channel" message is printed (instruction 1227) and the loop returns to the beginning of the instruction routine and is now set up to accept the entry of numbers (instruction 1228).

If new feeder line information is to be entered, the instruction routine proceeds via decisions 1203, and 1207 to the enter instruction routine beginning at terminal 1229. A determination is made to ascertain if the enter button has been pushed for the first or second time in decision 1231. This determines if a feeder channel number or its capacity is to be entered. If this is the first push of the enter button, the program proceeds to decision 1233, which determines if the operator has entered the number of an existing channel and wishes to change its capacity or delete it. If the enter button has been pressed for the final time as per decision 1231, the program proceeds to terminal 1251 to initiate the entering of a feeder line rating value as discussed below.

Decision 1235 determines if an entered channel number is indeed a valid operative feeder line or channel. If it is not an "invalid number" message is printed (instruction 1237) and the instruction flow returns (instruction 1239) to the beginning of the loop. A subsequent decision 1241 inquires if this channel, as selected, is one already monitored. If it is already present and being monitored, a request is printed to push entry button again before a new value is entered. If this channel is a new channel, the routine proceeds to terminal 1247 to facilitate the entry (instruction 1249) of a new identifying bit in the active channel word stored in the dual access memory which serves to identify the active feeder lines or channels being monitored.

For channels already selected and receiving a new rating value as determined by decision 1231, the instruction flow proceeds directly to terminal 1251. The channel may be deleted from the list by entering a zero value, as per decision 1253 and instruction 1255. A number entered is considered a capacity value for the feeder line as per instruction 1259.

A request for feeder line statistics representing feeder line performance over an extended time interval such as average, maximum or minimum values, cause a switch from terminal 1109 to the feeder statistics case having instructions beginning at terminal 1301 in FIG. 10. The instructions first determine if the request or interrupt source was a clear, number or enter button, as per decision 1303 and 1305. A clear button push advances to the instruction 1319 which replaces existing statistical values with the zero values to establish a starting point for statistics acquisition at the beginning of the program. The next and previous lines are identified in instruction 1307 to evaluate reliability of the numbers. A decision 1309 determines if any channel or feeder lines have any valid data and a present channel is selected for read out in instruction 1311. If this read out does not represent the last line, its value is displayed as per instruction 1317 and the loop returns per terminal 1318 to the origin to display statistics from the next line. If it is the last line as per decision 1313, a message is printed "to clear statistics, refer to manual" and the loop terminates. All values requested are placed at proper memory locations in the dual access memory as per instruction 1321 where they are accessible by the rectifier plant controller. When the last line is reached, decision 1320, the routine automatically returns via terminal 1323. The basic processing disclosed above covers the acquisition of information concerning the status of the active feeder lines. Many other features and enhancements not disclosed will be apparent to those skilled in the art without departing from the spirit and scope of the invention. For example, the stored program may identify the present state of the circuit breakers and identify and print a message identifying a feeder as being presently out of service.

What is claimed is:

1. In a rectifier plant system; including a first stored program associated with a first memory;
   a rectifier plant controller under control of the first stored program associated with the first memory and operative to control an operative state of a plurality of rectifier plants so that a selected number of the plurality of rectifier plants is enabled operating to meet a load requirement with high efficiency, a feeder line monitoring arrangement collecting data in the rectifier plant system comprising:

a feeder monitor embodied in a separate independent package and devised to be added as an option to the rectifier plant system and including a second memory and under control of a second stored program in a third memory at the feeder monitor and further including feeder line current sensors coupled for sensing current in a plurality of feeder lines, and the second memory being directly accessible by both the rectifier plant controller and the feeder monitor;

the rectifier plant controller including means for designating particular feeder lines to be monitored by generating a control word and storing that word in the second memory, the second stored program of the feeder monitor accessing the control word stored in the second memory and the second stored program responding to the control word to cause the feeder monitor to monitor signals of designated ones of the feeder lines and storing data representative of current signal magnitudes on monitored feeder lines in the second memory, and the rectifier plant controller retrieving data representing signal magnitudes from the second memory and transferring the data representing signal magnitudes to the first memory whereby the first stored program is operative to process the data representing signal magnitudes to determine a signal condition of a feeder line monitored by the feeder monitor.

2. A feeder line monitoring arrangement as defined in claim 1 wherein:

the feeder line current sensors are each connected to a multiplexer and the second stored program being responsive to the control word to control the multiplexer to connect selected current sensors to an amplitude-to-frequency conversion circuit, and a counting arrangement to count a frequency output of the amplitude to frequency conversion circuit for a fixed time interval.

3. A feeder line monitoring arrangement as defined in claim 2 wherein:

commands to retrieve data about a particular feeder line originate under control of the first stored program of the rectifier plant controller and are entered by activating a combination of key entries at a control panel, and the second stored program of the feeder monitor includes instructions operative to analyze a combination of key entries to specify a particular command request.

4. A feeder line monitoring arrangement as defined in claim 3 wherein:

the first stored program of the rectifier plant controller includes instructions to convert data acquired from the second memory into feeder line signal values.

5. A feeder line monitor arrangement as defined in claim 4 wherein:

the second stored program of the feeder monitor includes instructions to supply cumulative data to the second memory, and the first stored program of the rectifier plant controller includes instructions for converting the cumulative data to time interval averaged signal information.

6. A feeder line monitoring arrangement as defined in claim 5 wherein:

the feeder monitor is continuously operative and data is continuously updated in the second memory, and the rectifier plant controller accesses data in the memory in response to specific commands.

* * * * *